(12) United States Patent
Chandra et al.

(10) Patent No.: US 7,363,387 B1
(45) Date of Patent: Apr. 22, 2008

(54) SYSTEM AND METHOD FOR REDUCING INFORMATION BEING TRANSMITTED IN A NETWORK ENVIRONMENT

(75) Inventors: Madhavi W. Chandra, Cary, NC (US); David A. Cook, Raleigh, NC (US); Alvaro E. Retana, Morrisville, NC (US); Russell I. White, Holly Springs, NC (US); Yi Yang, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 10/733,039

(22) Filed: Dec. 9, 2003

(51) Int. Cl.
*G06F 15/173* (2006.01)

(52) U.S. Cl. ............... 709/242; 709/220; 709/228; 709/230; 709/238

(58) Field of Classification Search ............... 709/242
See application file for complete search history.

(56) References Cited

U.S. PATENT DOCUMENTS

| | | | |
|---|---|---|---|
| 5,511,122 A | 4/1996 | Atkinson | 380/25 |
| 5,825,772 A | 10/1998 | Dobbins et al. | 370/396 |
| 6,108,702 A | 8/2000 | Wood | 709/224 |
| 6,111,884 A | 8/2000 | Ahuja et al. | 370/401 |
| 6,131,120 A | 10/2000 | Reid | 709/225 |
| 6,151,324 A | 11/2000 | Belser et al. | 370/397 |
| 6,256,295 B1 | 7/2001 | Callon | 370/254 |
| 6,347,078 B1 | 2/2002 | Narvaez-Guarnieri et al. | 370/230 |
| 6,385,174 B1 | 5/2002 | Li | 370/252 |
| 6,405,248 B1 | 6/2002 | Wood | 709/223 |
| 6,449,279 B1 | 9/2002 | Belser et al. | 370/397 |
| 6,483,833 B1 | 11/2002 | Jagannath et al. | 370/392 |
| 6,526,052 B1 | 2/2003 | Rijhsinghani et al. | 370/389 |
| 6,535,510 B2 | 3/2003 | Kalkunte et al. | 370/389 |
| 6,578,086 B1 | 6/2003 | Regan et al. | 709/242 |
| 6,625,156 B2 | 9/2003 | Shaio et al. | 370/395.21 |
| 6,639,897 B1 | 10/2003 | Shiomoto et al. | 370/238 |
| 6,657,965 B1 | 12/2003 | Shaffer et al. | 370/238 |
| 6,744,739 B2 * | 6/2004 | Martin | 370/254 |
| 7,042,850 B2 * | 5/2006 | Stewart | 370/254 |
| 2002/0169794 A1 * | 11/2002 | Jones et al. | 707/204 |
| 2005/0083964 A1 * | 4/2005 | Tatman et al. | 370/461 |

* cited by examiner

*Primary Examiner*—Jason Cardone
*Assistant Examiner*—Nicholas R Taylor
(74) *Attorney, Agent, or Firm*—Baker Botts L.L.P.

(57) ABSTRACT

A method for reducing information being transmitted in a network is provided that includes gleaning routing information being communicated by a first network element, the routing information being stored such that the routing information may be accessed. An adjacency protocol may be executed between the first network element and a second network element that allows for a data exchange between the first and second network elements. The first network element does not communicate the routing information gleaned by the second network element during the data exchange associated with the adjacency protocol.

21 Claims, 1 Drawing Sheet

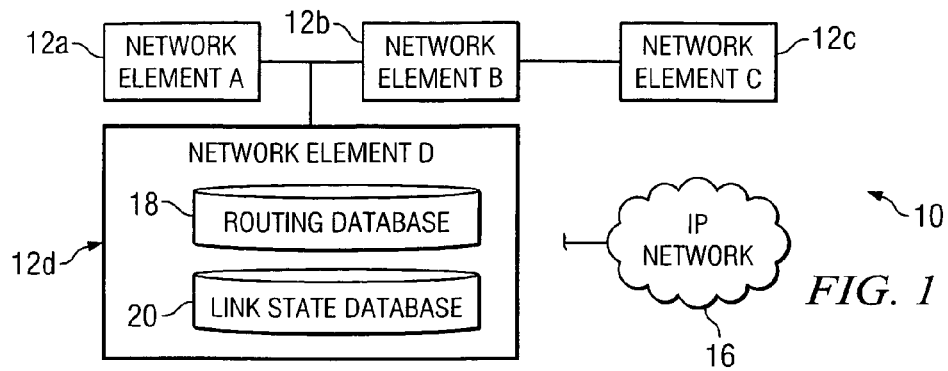
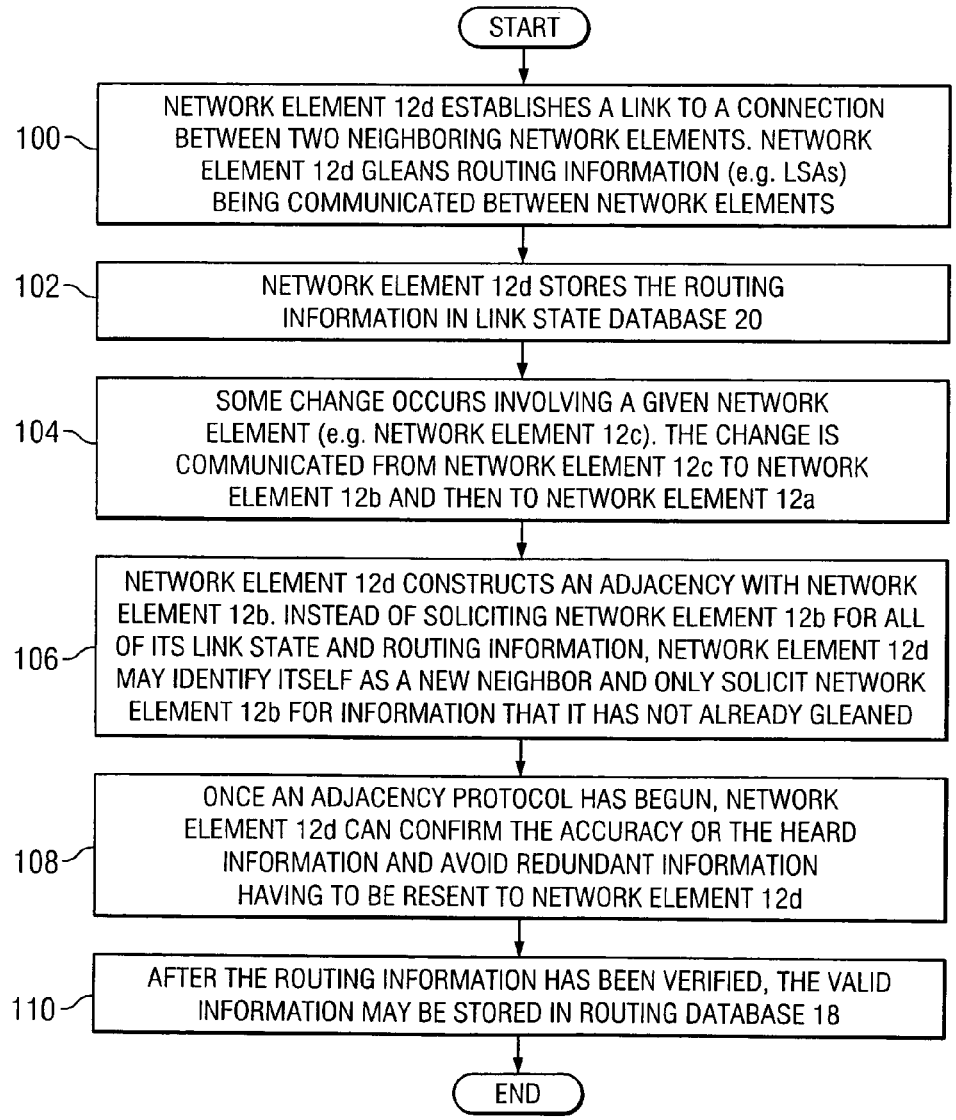

SYSTEM AND METHOD FOR REDUCING INFORMATION BEING TRANSMITTED IN A NETWORK ENVIRONMENT

TECHNICAL FIELD OF THE INVENTION

This invention relates in general to the field of network communications and, more particularly, to a system and method for reducing information being transmitted in a network environment.

BACKGROUND OF THE INVENTION

Routing protocols allow one or more components, devices, or modules to correctly direct information to its appropriate destination. There is a plethora of information that generally gets transmitted between network elements in order to ensure that databases are current, network addresses are accurate, and data paths are valid. The processing of such information can be time intensive in consuming bandwidth and inhibiting the speed of packet communications. Note that such processing steps, which are offered to maintain the integrity of network communications, are generally unavoidable. The potential removal of such efficacy protocols could make network communications susceptible to the mismanagement of data or improper routing of packets in the network. Accordingly, the ability to provide an architecture that optimally manages or directs information properly in a network, while providing accurate routing, provides a significant challenge to network operators and system.

SUMMARY OF THE INVENTION

From the foregoing, it may be appreciated by those skilled in the art that a need has arisen for an improved communications approach that offers proper information management for devices or components in a network environment. In accordance with one embodiment of the present invention, a system and method for reducing information being transmitting in a network environment are provided that substantially eliminate or greatly reduce disadvantages and problems associated with conventional communication techniques.

According to one embodiment of the present invention, there is provided a method for reducing information being transmitted in a network that includes gleaning routing information being communicated by a first network element, whereby the routing information is stored such that the routing information may be accessed. An adjacency protocol may be executed between the first network element and a second network element that allows for a data exchange between the first and second network elements. The first network element does not communicate the routing information gleaned by the second network element during the data exchange associated with the adjacency protocol.

Certain embodiments of the present invention may provide a number of technical advantages. For example, according to one embodiment of the present invention, an information management approach is provided that allows for a reduction in redundant communications that propagate in the network. This results in an architecture that is significantly faster because of the minimization of data transmissions. The transmission of link state requests and updates are minimized as a result of the ability of a given network element to store information that it gleans. Such information can be later referenced in order to obviate scenarios in which a network element is queried to retransmit information that was previously seen by a given network element. Increases in speed also generally result in the ability of a given architecture to accommodate increased bandwidth.

Another technical advantage associated with one embodiment of the present invention also relates to a speed enhancement. The speed of convergence is improved significantly, particularly in networks where changes are prolific (e.g. in a mobile network). Thus, each time a change occurs (e.g. a new peer comes up), information associated with these changes could be gleaned, stored, and later accessed such that it would not necessarily have to be exchanged at a later time.

Yet another technical advantage associated with one embodiment of the present invention is a result of its simplistic design. Adjustments and/or additions to existing (i.e. legacy) components may be effectuated in order to allow for the proper execution of the present data management approach. In a general sense, virtually any network architecture could be quickly and easily upgraded in order to perform more effective routing procedures. Minor modifications to existing network elements could result in significant benefits related to speed, optimization of bandwidth, and the reduction of time-intensive processing cycles. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for reducing information being transmitted in a network environment; and FIG. 2 is a flowchart illustrating a series of example steps associated with a method for reducing information being transmitted in a network environment.

DETAILED DESCRIPTION OF EXAMPLE EMBODIMENTS OF THE INVENTION

FIG. 1 is a simplified block diagram of a communication system 10 for reducing information being transmitted in a network environment in accordance with one embodiment of the present invention. Communication system 10 includes a set of network elements 12a-d, and an internet protocol (IP) network 16 (although the teachings of the present invention are not limited to an IP network, as explained more fully herein). Network elements 12a-d may be provided at an edge of IP network 16 or alternatively provided in any other suitable location. Network element 12d may include a general database 18 and a routing database 20. Additionally, network elements 12a-c may include a similar general database, although such is not shown in FIG. 1 for purposes of clarity and simplicity. Each of network elements 12a-d are illustrated as A-D respectively for discussion purposes, but such designations are arbitrary and do not connote any type of hierarchy or ranking. Communication system 10 may be positioned in any suitable network environment or communications architecture that operates to manage or otherwise direct information using any appropriate routing protocol or data management standard. For example, communication system 10 may be provided in conjunction with an interior gateway routing protocol (IGRP), an enhanced IGRP (EIGRP), an open shortest path first (OSPF), or an intermediate system-to-intermediate system (IS-IS) protocol.

In accordance with the teachings of the present invention, communication system 10 operates to glean, store, and subsequently use routing information (e.g. link state advertisements (LSAs)) received from non-adjacent network elements, which otherwise would be discarded. This allows for a reduction in overhead from link state requests and updates and may further minimize the retransmission of LSA requests and updates that have already been gleaned by a given network element.

For purposes of teaching and explanation, it is helpful to offer some fundamental information associated with the operation of a given communications platform that exists between two network elements. Network elements being neighbors alone does not guarantee an exchange of link state updates. The network elements generally form adjacencies in order for this to happen. Interface type may play a role in how adjacencies are formed. For example, neighbors on point-to-point links uniformly and systematically become adjacent. Once a given network element decides to form an adjacency with a neighbor, it starts by exchanging a brief description of its full link state database (i.e. it tells its peers all entries stored in its associated database—giving an overview of each entry but omitting the entry details). The neighbor follows suit. After passing through several neighbor states the network elements then achieve adjacency.

In regards to OSPF communications, after a network element receives database descriptors (DBDs) from a neighbor, the network element knows which of the neighbor's LSAs it does not have and which of the neighbor's LSAs are more recent. The network element may then send link state requests to the neighbor requesting the desired LSAs, and the neighbor may respond by flooding the LSAs in link state update packets. The larger the differential in the two databases, the larger the number of packets exchanged and, hence, the longer it will take the for the synchronization process to be completed.

Consider that a network element accepts LSAs only on adjacencies, i.e., the packets have to be sent out by one of the network element's active neighbors. In dynamic environments, such as a mobile ad hoc network (MANET), a network element has a high probability of receiving LSAs from non-adjacent network elements (physically connected, but not adjacent from the layer three protocol) and the network element has to expend resources to discard those packets. This procedure is wasteful because it fails to maintain or to utilize information that must later be requested, transmitted, and used.

Communication system 10 addresses this inadequacy by using such LSAs (i.e. routing information) to reduce the overhead from link state requests and following updates. In order to reduce the overhead from link state requests and updates, when network element 12d sees LSAs from non-adjacent network elements (e.g. network element 12b), it will not discard them: instead, network element 12d puts them into routing database 20. When a new neighbor is detected and the DBD exchange process is initiated, network element 12b will not include LSAs from routing database 20 in the local DBDs. Network element 12d can compare the DBD entries from the neighbor against its general database 18 and routing database 20 and determine which LSAs it needs to request. Network element 12d can then request only the LSAs that are not already present in either database. Where an LSA in routing database 20 is verified by DBD from a peer, the LSA can be moved from routing database 20 to general database 18. Note that to reduce the redundancy of LS requests, network element 12d does not send two LS requests within one LS request interval (e.g. LS_REQ_INTERVAL). When network element 12d calculates the shortest path first (SPF), it can use the LSAs in general database 18, but not necessarily use them in routing database 20.

The LSAs in routing database 20 can be maintained until: 1) they are verified by DBDs and moved to general database 18; 2) the same LSA has been received from an adjacent network element; 3) a more recent LSA has been received; 4) LSAs are aged out; or 5) network element 12d discards the LSAs in order to make use of the resources.

As a result of the data management approach of communication system 10, faster convergence may be achieved, which results in optimal data management capabilities being provided to the network. This may be particularly important in dynamic networks where change is frequent. Convergence is a principle that generally reflects a concept in which a consistent view or a common status is shared by one or more network elements that are associated with the routing or management of information. Convergence may also represent a fluid concept in that any one or more components, devices, elements, or any other piece of network equipment may move into a state of convergence and then become unconverged. During such states of instability, network equipment may be susceptible to routing information incorrectly or managing communications improperly. Thus, the speed of convergence can be critical to any effective routing protocol for a given network.

In operation of an example embodiment, it is presumed that network element 12a is coupled to network element 12b, which is coupled to network element 12c. Network element 12d is linked to the connection between network element 12a and network element 12b. The connection between network element 12a and network element 12b is a broadcast link in one example embodiment. Alternatively, the connection between any two network elements may be any suitable coupling or linkage such that data or information may be gleaned by network element 12d. Adjacency exists between network elements 12a, 12b, and 12c. No connectivity exists between network element 12d and network element 12c or between network element 12a and network element 12c. Network element 12d may be able to glean routing information being communicated to network element 12a from network element 12b. This is true even though network element 12d is not adjacent to network element 12a. Once network element 12d is physically linked to the connection between network element 12a and network element 12b, network element 12d is capable of gleaning data associated with such inter-element communications.

In normal or standard link state routing, even though network element 12d may be capable of accessing the information contained within communications between network element 12a and network element 12d, this information is generally discarded or ignored. This is generally because network element 12d does not have an adjacency with network element 12a or network element 12b. Only after the adjacency process has begun would routing information be exchanged between network element 12d and network element 12b. For example, in a standard routing protocol, network element 12d would send a HELLO packet to network element 12b. Advertising DBDs is proactive, rather than reactive, after a query. Network elements 12b and 12d would then exchange database information. Note that, in general, this would require network element 12d to ask for all of the relevant or appropriate information contained in a database within network element 12*b*. Such an operation may be time-intensive, as such a process may require retrieving information on an item by item-basis, whereby the entire database would have to be walked through. Communication system 10 addresses the waste of potentially useful information in the following manner.

For purposes of example, it is presumed that some change occurs involving network element 12*c*. The change is communicated from network element 12*c* to network element 12*b* and then to network element 12*a*. Network element 12*d* may glean the information being communicated between network element 12*b* to network element 12*a*. The information being communicated between network element 12*a* and network element 12*b* may be associated with network pathways, network addresses, link state information, network updates, the status of any piece of network equipment, or any other suitable routing information where appropriate and based on particular communication needs.

Network element 12*d* may store this information in routing database 20 such that it may be referenced at a later time. Subsequently, when network element 12*d* constructs an adjacency with network element 12*b* (e.g. upon receiving a HELLO packet from network element 12*b*), instead of soliciting network element 12*b* for all of its link state/routing information, network element 12*d* may identify itself as a new neighbor and avoid retransmitting the previously communicated change data associated with network element 12*c*. Note that any other information (other than that which is associated with the change) that has already been gleaned does not have to be retransmitted to network element 12*d*.

Such a data management protocol would significantly reduce the number of transmissions network element 12*b* would have to make because of the storage capability being provided to network element 12*d*. This allows network element 12*d* to maintain pertinent information and access it at a future time once adjacency protocols have been initiated. Thus, network element 12*d* stores heard, but unverified routing information. Once an adjacency protocol has begun, network element 12*d* can confirm the accuracy or the heard information and avoid redundant information having to be resent to network element 12*d*. After the information has been verified, the valid information may be stored in general database 18.

Communication system 10 offers an architecture that is significantly faster because of the minimization of data transmissions. Link state requests and updates would be reduced considerably as a result of the ability of a given network element to store information that it gleans. Additionally, the speed of convergence would be enhanced particularly in network where changes are prolific (e.g. a mobile network). Thus, each time a change occurs (e.g. a new peer comes up), information associated with these changes could be stored and hence, not necessarily exchanged at a later time. Additionally, adjustments and/or additions to existing (i.e. legacy) components may be effectuated in order to allow for this enhanced data management approach. In a general sense, many types of network architectures could quickly and easily be upgraded in order to minimize traffic overhead and time-intensive processing operations. This is a result of the simplicity of the architecture of communication system 10.

Network elements 12*a*-*d* are pieces of network equipment operable to communicate in a network environment. Network elements 12*a*-12*d* may manage, direct, or otherwise facilitate the propagation of information between two nodes in a network environment. In one embodiment, network elements 12*a*-*d* are edge routers (positioned on the edge of IP network 16) that include appropriate software operable to glean information between two network elements. This information can be temporarily stored internally or in any other suitable location. Alternatively, network elements 12*a*-*d* may be switches, bridges, gateways, processors, load-balancers, or any other suitable component, device, element, or object operable to exchange information or data. Additionally, each of network elements 12*a*-*d* may include any suitable hardware, processors, algorithms, software, components, or elements operable to execute one or more of the operations thereof or to provide some communication or processing capability to any of network elements 12*a*-*d*.

In a particular embodiment of the present invention, network element 12*d* includes general database 18 and routing database 20. Note that alternatively, either or both of these elements may be provided external to network element 12*d*. General database 18 is operable to store routing information that has been verified or validated and may additionally store link state entries from adjacent neighbors. Routing database 20 temporarily stores routing information (e.g. link state requests and updates) that can subsequently be referenced in order to reduce redundant packet transmissions in communication system 10. Thus, routing database 20 is equipped to store temporary link state entries from network elements that are not adjacent neighbors at that point. Routing database 20 is a software table that stores such information in accordance with a particular embodiment of the present invention. Routing database 20 may be replaced by any suitable device, component, hardware, application specific integrated circuit (ASIC), processor, object or element that stores such information: allowing a given network element to retrieve information that was previously gleaned or learned from communications involving other network equipment. Validated or verified information may be moved to general database 18 once network element 12*d* has confirmed its authenticity or integrity.

IP network 16 represents a series of points or nodes of interconnected communication paths for receiving and transmitting packets of information that propagate through communication system 10. In a particular embodiment, IP network 16 represents a packet data network (PDN). IP network 16 may offer a communications interface or exchange between any two nodes in communication system 10. IP network 16 may alternatively be any local area network (LAN), metropolitan area network (MAN), wide area network (WAN), wireless local area network (WLAN), virtual private network (VPN) or any other appropriate architecture or system that facilitates communications in a network environment. IP network 16 may implement a transmission control protocol/internet protocol (TCP/IP) communications language architecture in a particular embodiment of the present invention. However, IP network 16 may alternatively implement any other suitable communication protocol for transmitting and receiving data packets within communication system 10. This would allow communication system 10 to be applicable in any number of environments, such as within AppleTalk or IPX protocols for example.

FIG. 2 is a simplified flowchart illustrating a series of example steps associated with a method for reducing information being transmitted in a network environment. The method may then begin at step 100 where network element 12*d* establishes a link to a connection between two neighboring network elements. Network element 12*d* gleans routing information (e.g. LSAs) being communicated to network element 12*a* from network element 12*b*.

At step 102, network element 12d stores the routing information that it gleans in routing database 20. Note that this data collection is executed even though network element 12d is not adjacent to network element 12a. Once network element 12d is physically linked to the connection between network element 12a and network element 12b, network element 12d is capable of gleaning the data. At step 104, it is assumed that some change occurs involving a given network element (e.g. network element 12c). The change is communicated from network element 12c to network element 12b and then to network element 12a. Network element 12d gleans the information being communicated between network element 12b to network element 12a during this update. The routing information being communicated between network element 12a and network element 12b may be associated with the change and include data relating to network element addresses, routing pathways, network locations/destinations, etc.

This information, like all other routing data that propagates between network element 12b and network element 12a may be stored in routing database 20 such that it may be referenced at a later time. At step 106, network element 12d constructs an adjacency with network element 12b (e.g. upon receiving a HELLO packet from network element 12b). Instead of soliciting network element 12b for all of its link state and routing information, network element 12d may identify itself as a new neighbor and only solicit network element 12b for information that it has not already gleaned.

Once an adjacency protocol has begun, network element 12d can confirm the accuracy or the heard information and avoid redundant information having to be resent to network element 12d at step 108. After the routing information has been verified, the valid information may be stored in general database 18 at step 110. Such a protocol would significantly reduce the number of transmissions network element 12b would have to make because of the storage capability being provided to network element 12d. This allows network element 12d to hear information and access it at a future time once adjacency protocols have been initiated.

Some of the steps illustrated in FIG. 2 may be changed or deleted where appropriate and additional steps may also be added to the flowchart. These changes may be based on specific system architectures or particular communication arrangements or configurations and do not depart from the scope or the teachings of the present invention.

It is also important to note that communication system 10 may be implemented in accordance with a number of routing protocols. The embodiment described with reference to FIG. 1 and to the OSPF standard has been offered for purposes of example only. Communication system 10 may be implemented with any other appropriate routing protocol in accordance with particular needs. Other protocols that may be readily implemented without departing from the scope of the present invention include (but are not limited to) any generic border gateway protocol (BGP), multi-protocol label switching (MPLS), express forwarding (EF), IS-IS protocol, IGRP, EIGRP, or any other suitable forwarding or routing protocol deemed appropriate.

Although the present invention has been described in detail with reference to particular embodiments, it should be understood that various other changes, substitutions, and alterations may be made hereto without departing from the spirit and scope of the present invention. For example, although the present invention has been described with reference to a particular internal configuration of network element 12d, any one or more of these elements may be provided external to network element 12d as its own separate component, element, or object. Moreover, any one or more of the elements included within network element 12d may be provided in a single unit that may comprise hardware, software, or any other suitable element or object operable to effectuate its tasks or operations. Network element 12d of FIG. 1 has only been offered for purposes of example and teaching and accordingly should be construed as such. In certain embodiments, routing database 20 may be provided within general database 18 or vice versa such that the two elements cooperate in order to achieve the operations as described herein.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for reducing information propagating in a network environment, comprising: a first network element operable to glean routing information being communicated by a second network element, the routing information being stored such that the routing information may be accessed, wherein the first and second network elements may cooperate in an adjacency protocol that allows for a data exchange between the first and second network elements, and wherein the second network element does not communicate the routing information gleaned by the first network element during the data exchange associated with the adjacency protocol, whereby the first network element, when receiving link state advertisements from non-adjacent network elements, stores the link state advertisements, and whereby when the first network element detects a new neighbor and starts a database descriptors (DBD) exchange process, the first network element will not include the link state database advertisements in the DBD exchange process, the first network element comparing one or more DBD entries from the neighbor against its normal and temporary link state databases to determine which link state advertisements it needs to request.

2. The apparatus of claim 1, wherein the first network element includes a routing database that is operable to store the routing information.

3. The apparatus of claim 2, wherein the first network element includes a general database, and wherein the first network element is operable to verify the routing information with the second network element such that verified information from the routing database may be stored in the general database.

4. The apparatus of claim 1, wherein the network element is a selected one of a group of elements consisting of:
   a router;
   a switch;
   a loadbalancer;
   a processor;
   a bridge; and
   a gateway.

5. The apparatus of claim 1, wherein the first network element implements a communications protocol that is selected from a group of protocols consisting of:
- an interior gateway routing protocol (IGRP);
- an enhanced IGRP (EIGRP);
- non-stop forwarding (NSF) protocol;
- multi-protocol label switching (MPLS) protocol;
- intermediate system-to-intermediate system (IS-IS) protocol;
- express forwarding (EF) protocol;
- open shortest path first (OSPF) protocol; and
- stateful switch over (SSO) protocol.

6. The apparatus of claim 1, wherein the routing information is communicated by the second network element in response to a change in a third network element that is operable to communicate with the second network element.

7. The apparatus of claim 1, wherein the routing information includes link state advertisements, requests, and updates, and wherein the data exchange associated with the adjacency protocol includes an exchange of database descriptors (DBDs).

8. A method for reducing information propagating in a network environment, comprising: gleaning routing information being communicated by a first network element, the routing information being stored such that it may be accessed; and executing an adjacency protocol between the first network element and a second network element that allows for a data exchange between the first and second network elements, wherein the first network element does not communicate the routing information gleaned by the second network element during the data exchange associated with the adjacency protocol, whereby the first network element, when receiving link state advertisements from non-adjacent network elements, stores the link state advertisements, and whereby when the first network element detects a new neighbor and starts a database descriptors (DBD) exchange process, the first network element will not include the link state database advertisements in the DBD exchange process, the first network element comparing one or more DBD entries from the neighbor against its normal and temporary link state databases to determine which link state advertisements it needs to request.

9. The method of claim 8, further comprising:
accessing the routing information in order to make a comparison such that the routing information gleaned by the second network element during the data exchange associated with the adjacency protocol is not communicated to the second network element.

10. The method of claim 8, further comprising:
verifying the routing information with the first network element such that verified information may be stored in a general database.

11. The method of claim 8, further comprising:
implementing a communications protocol in the second network element, the communications protocol being selected from a group of protocols consisting of:
- an interior gateway routing protocol (IGRP);
- an enhanced IGRP (EIGRP);
- non-stop forwarding (NSF) protocol;
- multi-protocol label switching (MPLS) protocol;
- intermediate system-to-intermediate system (IS-IS) protocol;
- express forwarding (EF) protocol;
- open shortest path first (OSPF) protocol; and
- stateful switch over (SSO) protocol.

12. The method of claim 8, further comprising:
communicating the routing information in response to a change in a third network element that is operable to communicate with the first network element.

13. A system for reducing information propagating in a network environment, comprising:
means for gleaning routing information being communicated by a first network element, the routing information being stored such that it may be accessed; and
means for executing an adjacency protocol between the first network element and a second network element that allows for a data exchange between the first and second network elements, wherein the first network element does not communicate the routing information gleaned by the second network element during the data exchange associated with the adjacency protocol, whereby the first network element, when receiving link state advertisements from non-adjacent network elements, stores the link state advertisements, and whereby when the first network element detects a new neighbor and starts a database descriptors (DBD) exchange process, the first network element will not include the link state database advertisements in the DBD exchange process, the first network element comparing one or more DBD entries from the neighbor against its normal and temporary link state databases to determine which link state advertisements it needs to request.

14. The system of claim 13, further comprising:
means for accessing the routing information in order to make a comparison such that the routing information gleaned by the second network element during the data exchange associated with the adjacency protocol is not communicated to the second network element.

15. The system of claim 13, further comprising:
means for verifying the routing information with the first network element such that verified information may be stored in a general database.

16. The system of claim 13, further comprising:
means for implementing a communications protocol in the second network element, the communications protocol being selected from a group of protocols consisting of:
- an interior gateway routing protocol (IGRP);
- an enhanced IGRP (EIGRP);
- non-stop forwarding (NSF) protocol;
- multi-protocol label switching (MPLS) protocol;
- intermediate system-to-intermediate system (IS-IS) protocol;
- express forwarding (EF) protocol;
- open shortest path first (OSPF) protocol; and
- stateful switch over (SSO) protocol.

17. The system of claim 13, further comprising:
means for communicating the routing information in response to a change in a third network element that is operable to communicate with the first network element.

18. Software for reducing information propagating in a network environment, the software being embodied in a computer readable medium and comprising computer code such that when executed is operable to:
glean routing information being communicated by a first network element, the routing information being stored such that it may be accessed; and execute an adjacency protocol between the first network element and a second network element that allows for a data exchange between the first and second network elements, wherein the first network element does not communicate the routing information gleaned by the second network element during the data exchange associated with the adjacency protocol, whereby the first network element, when receiving link state advertisements from non-adjacent network elements, stores the link state advertisements, and whereby when the first network element detects a new neighbor and starts a database descriptors (DBD) exchange process, the first network element will not include the link state database advertisements in the DBD exchange process, the first network element comparing one or more DBD entries from the neighbor against its normal and temporary link state databases to determine which link state advertisements it needs to request.

19. The medium of claim 18, wherein the code is further operable to:

access the routing information in order to make a comparison such that the routing information gleaned by the second network element during the data exchange associated with the adjacency protocol is not communicated to the second network element.

20. The medium of claim 18, wherein the code is further operable to:

verify the routing information with the first network element such that verified information may be stored in a general database.

21. The medium of claim 18, wherein the code is further operable to:

communicate the routing information in response to a change in a third network element that is operable to communicate with the first network element.

\* \* \* \* \*